United States Patent
Gonzales, Jr.

(10) Patent No.: US 11,182,993 B2
(45) Date of Patent: Nov. 23, 2021

(54) ACCESS DETECTION DEVICE (71) Applicant: Oversight Investments, Inc., Woodway, WA (US)

(72) Inventor: Thomas Arthur Gonzales, Jr., Woodway, WA (US)

(73) Assignee: OVERSIGHT INVESTMENTS, Woodway, WA (US)

( * ) Notice: Subject to any disclaimer, the term of this patent is extended or adjusted under 35 U.S.C. 154(b) by 60 days.

(21) Appl. No.: 16/523,715

(22) Filed: Jul. 26, 2019

(65) Prior Publication Data
US 2021/0027560 A1    Jan. 28, 2021

(51) Int. Cl.
*G07C 9/00* (2020.01)
*G06F 21/86* (2013.01)

(52) U.S. Cl.
CPC ......... *G07C 9/00896* (2013.01); *G06F 21/86* (2013.01); *G07C 2009/0092* (2013.01); *G07C 2209/64* (2013.01)

(58) Field of Classification Search
CPC .... G06Q 10/08; G06Q 10/083; G06Q 10/833; G06Q 30/0185; G06Q 50/12; G06Q 10/0836; G06Q 10/87; G06Q 50/28; G06Q 10/0832; G06Q 10/0833; G06Q 10/0837; A47G 2029/144; A47G 2029/145; A47G 2029/147; A47G 2029/149; A47G 29/10; A47G 29/141; A47G 29/22; A47G 29/20; A47G 2029/148; B60P 3/03; B60P 3/14; B60R 2325/205; B60R 25/1003; B60R 25/1004; B60R 25/102; B60R 25/33; B60R 21/01516; B60R 21/01534; B60R 21/01536; B60R 21/01538;
(Continued)

(56) References Cited

U.S. PATENT DOCUMENTS

2005/0232747 A1    10/2005    Brackmann et al.
2006/0224355 A1    10/2006    Morrison et al.
(Continued)

OTHER PUBLICATIONS

Drimer, et al., "Thinking inside the box: system-level failures of tamper proofing," 2008 IEEE 1-20 Symposium on Security and Privacy, Feb. 2008, retrieved on Sep. 26, 2020 from <https://www.cl.cam.ac.uk/techreports/UCAM-CL-TR-711 .pdf>, pp. 1-37.
(Continued)

*Primary Examiner* — Dionne Pendleton (57) ABSTRACT

A System, method, or device may include delivery device comprising a receptacle for receiving a load, a coupler for closing an access opening of the receptacle, and an access sensor for detecting an access event at the coupler or access opening. The delivery device may include one or more of a content sensor (e.g., to detect a weight of the load), an environment sensor, and a delivery assistance system. A remote server may receive a delivery request from a recipient device indicating a pick-up location and a drop-off location associated with the recipient device and, in response, store an association of the delivery device with the delivery personnel. Upon detecting the occurrence of the access event, the system may determine whether the access event comprises an authorized event or a tamper event, and send a notification indicating whether the access event comprises the authorized event or the tamper event.

17 Claims, 3 Drawing Sheets

(58) Field of Classification Search
CPC .............. B60R 2325/105; B60R 25/104; E05B
19/0005; E05B 2047/0058; E05B
2047/0094; E05B 45/06; E05B 65/52;
E05B 67/383; E05B 73/00; G01G 19/00;
G01G 19/415; G01G 23/42; G01S
5/0027; G07C 9/00571; G07C 9/00896;
G07C 2009/00769; G07C 2009/0092;
G07C 2209/02; G07C 2209/63; G07C
2209/64; G07C 3/00; G07C 5/085; G07C
9/00309; G07C 9/215; G07C 2009/00396;
G07C 2009/00928; G07C 2209/08; G07C
9/00912; G07C 9/28; G07G 1/0054;
G07G 1/0072; G07G 1/009; G07G 3/003;
G08B 13/1436; G08B 13/1445; G08B
13/1481; G08B 13/149; G08B 13/2462;
G08B 21/0269; G08B 13/2494; G08B
13/10; G08B 13/1966; G08B 13/19695;
G08B 3/10; G08B 5/223; G01B 11/00;
G01B 21/18; G01B 17/00; G01F 17/00;
G06F 16/254; G06F 21/86; G06F
16/90335; G06K 19/0723; G06K
2007/10504; G06K 7/10297; G06K
7/10415; G06K 7/10732; G06K 7/10821;
G06K 9/00771; G06K 9/00832; G06K
9/66; G06K 7/10366; G06K 7/1413;
G06K 9/209; G06K 9/6202; G07B
15/063; G07F 17/12; G08G 1/205; A47J
47/14; H04L 67/125; H04N 7/147; H04N
7/186; H04N 7/188; H04W 4/80; B08B
13/00; B08B 2209/08; B08B 9/00; B08B
9/08; B08B 9/0861; B08B 9/093; B65D
43/16; B65D 51/24; B65D 55/14; B65D
1/24; B65D 85/10; B65D 85/20; B65F
1/062; B65F 1/1638; B65F 2210/168;
B65F 2240/164; G05D 1/0088; G05D
1/0276; G05D 1/0297; G05D 2201/02;
G05D 2201/0213; G06T 7/20; H01L
21/67028; H01L 21/6704; A24F 15/12;
A24F 15/20; A24F 40/95; A61J 2200/30;
A61J 7/0076; A61J 7/0418; A61J 7/0427;
A61J 7/0445; A61L 12/086; A61L
2202/14; A61L 2202/15; A61L 2202/16;
A61L 2202/17; A61L 2202/23; A61L
21/16; A61L 2/22; A61L 2/24

See application file for complete search history.

(56) References Cited

U.S. PATENT DOCUMENTS

| | | | |
|---|---|---|---|
| 2008/0042809 A1 | 2/2008 | Watts et al. | |
| 2008/0158002 A1 | 7/2008 | Parkinson et al. | |
| 2008/0173706 A1 | 7/2008 | Skaaksrud et al. | |
| 2008/0246587 A1 | 10/2008 | Fisher | |
| 2009/0143923 A1* | 6/2009 | Breed | B60R 21/01516 |
| | | | 701/1 |
| 2015/0262121 A1 | 9/2015 | Riel-Dalpe et al. | |
| 2015/0310381 A1 | 10/2015 | Lyman et al. | |
| 2015/0371468 A1* | 12/2015 | Mackin | G07F 17/12 |
| | | | 340/5.26 |
| 2017/0127868 A1 | 5/2017 | Adewuyi | |
| 2018/0024554 A1* | 1/2018 | Brady | G05D 1/0088 |
| | | | 701/23 |
| 2018/0075681 A1* | 3/2018 | Scalisi | G06K 9/00771 |
| 2019/0104876 A1* | 4/2019 | Loures | A47G 29/20 |
| 2020/0000261 A1* | 1/2020 | Chambers | G07C 9/00309 |
| 2020/0261612 A1* | 8/2020 | Wei | B08B 13/00 |

OTHER PUBLICATIONS

PCT Search Report and Written Opinion dated Oct. 20, 2020 for PCT Application No. PCT/US20/43474, 12 pages.

\* cited by examiner

ACCESS DETECTION DEVICE

BACKGROUND

Millions of food deliveries occur every day around the world. Food deliveries by independently contracted drivers have gained popularity in recent years via service companies, such as Uber Eats, DoorDash®, Caviar, etc. When drivers for such companies use personal vehicles to deliver food, as is often the case, the drivers are usually within reaching distance of the food during the delivery. The temptation is clearly too much because occurrences of drivers taking some of the food while driving are common.

It may be difficult for a recipient of a delivery to detect if the driver opened the delivery bag or took food from the delivery bag. Undetected tampering and food stealing raises concerns of theft and economic loss, as well as food safety concerns because tampering and food stealing in a presumable unsterile environment can introduce bacteria (e.g., *E. coli, salmonella*, hepatitis A, norovirus, etc.) into the food which, in turn, can cause severe illness and death. These risks are damaging to consumers, and the service companies and restaurants may share liability for the driver's unauthorized conduct. Moreover, it may be difficult for the technology service companies to regulate the conduct of the drivers who are often granted substantial autonomy.

Additional issues arise when a single delivery bag carries multiple loads to multiple locations, and, if the loads are poorly or incorrectly labeled, the risk of mistakenly delivering one of the loads to an incorrect location is high. Additionally, it may be difficult to determine if weight labels on some food types (e.g., meat and produce) are accurate. Beyond food deliveries, other types of deliveries face similar problems.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure is directed to devices, systems, and methods for detecting an access event at a delivery device during a delivery. For instance, the delivery device may contain a load including food, a blood sample, a tissue sample, currency, or other items that may be delivered from a pick-up location to a drop-off location. In some instances, the delivery device may include a coupler for maintaining an access opening of the delivery device in a closed position, and an access sensor for detecting access events occurring at the access opening or coupler.

In some examples, a system may include the delivery device, a delivery personnel device associated with a delivery personnel, a delivery vehicle, a recipient device, a remote server, or combinations thereof. Upon receiving a delivery request (e.g., via a user input at the recipient device), the system may instruct the delivery personnel to pick-up the load (e.g., a food order from a restaurant) at a pick-up location. The delivery personnel may place the load in the delivery device, actuate a coupler, and/or provide an indication that the load has been picked up from the pick-up location and secured in the delivery device. The content sensor may detect a first weight value associated with the load at the pick-up location.

In some instances, the access sensor may detect a first access event during the delivery and, in response, one or more other sensors (e.g., a content sensor, an environment sensor, etc.) may collect information and send data to a local or remote computer-readable media. For instance, a weight value may be determined from the content sensor data and associated with the access event in memory storage. Location information may be determined and stored from a GPS sensor (e.g., the environment sensor of the delivery device or a sensor disposed in the delivery vehicle). The system may determine, via an event status determiner, an event status of the first access event, for instance, whether the first access event comprises a first authorized event or a first tamper event.

In some examples, the system may determine that the delivery device has arrived (e.g., is within a predetermined distance threshold) of the drop-off location. The system may detect a second access event associated with the drop-off location. In some instances, the system may determine whether the second access event comprises a second authorized event or a second tamper event, for example, based at least in part on whether the delivery device is within a predetermined distance value of the drop-off location and/or whether an input is received at the recipient device. In some examples, the delivery device may include a delivery assistance system comprising one or more components (e.g., a display, a microphone, an audio speaker, a light, a camera, etc.) that receive power, for instance, upon determining that the delivery device is within the predetermined distance of the drop-off location and/or in response to receiving a user input at the delivery personnel device and/or the recipient device.

Figure 1:
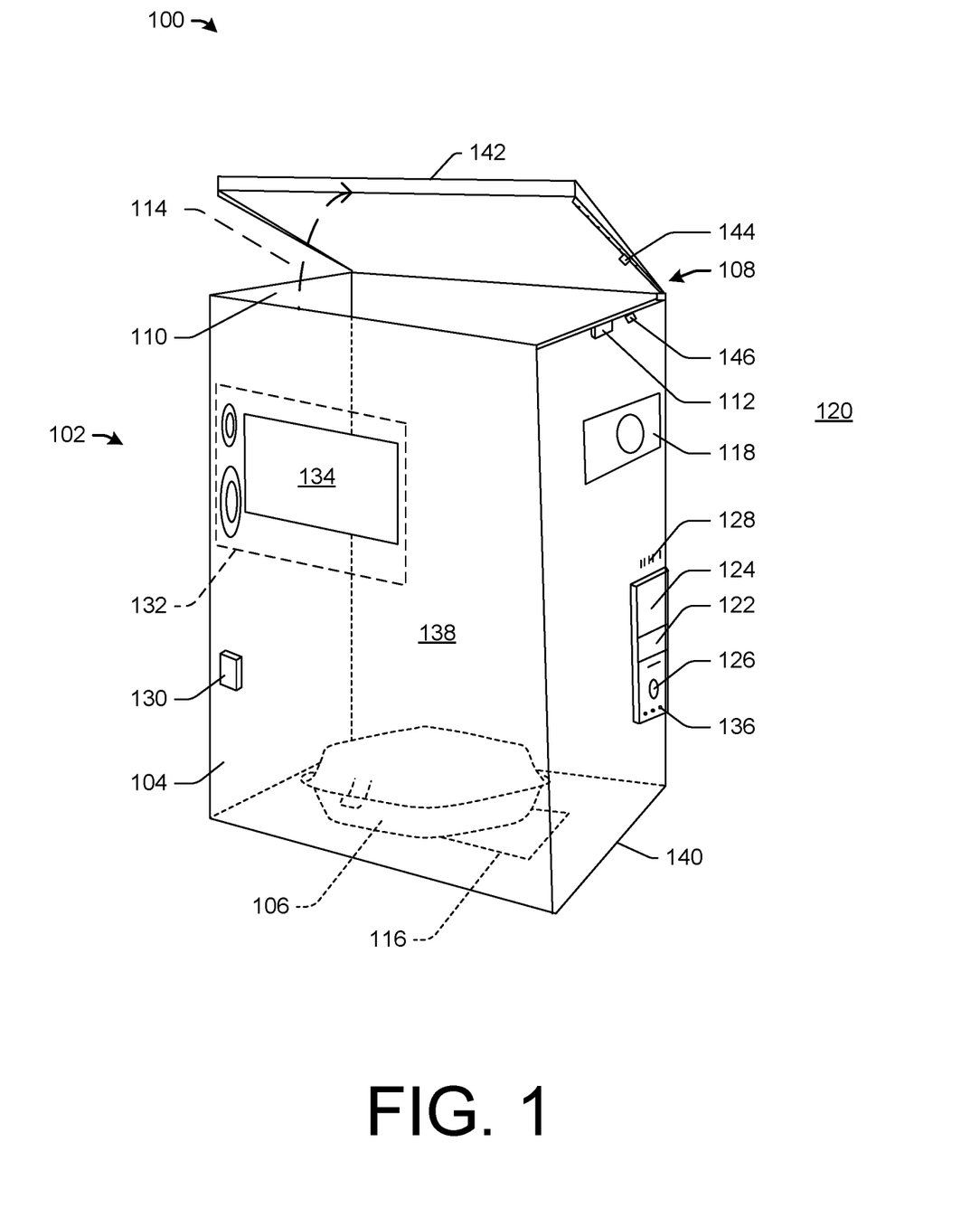
FIG. 1 depicts a schematic diagram of an example system including a delivery device that may carry a load and determine an occurrence of an access event during delivery of the load.

FIG. 1 depicts an example system 100 including a delivery device 102. The delivery device 102 may comprise one or more components such as: a receptacle 104 for containing a load 106, a coupler 108 for closing an access opening 110 into the receptacle 104, an access sensor 112 for detecting indications of an access event 114, a content sensor 116 for detecting one or more characteristics of the load 106, an environment sensor 118 for detecting environmental conditions 120 around the delivery device 102, a processor 122 for executing instructions stored on a computer-readable storage media 124, a wireless communicator 126 for communicating with one or more other device(s) (e.g., a remote server 126), a device identifier 128 unique to a particular delivery device 102, a security apparatus 130 for communicating with a corresponding security apparatus at a drop-off location (e.g., drop-off location 212 of FIG. 2), for instance, to disable a security system, a delivery assistance system 132 for providing communications (e.g., via a display 134) to delivery personnel during a delivery process, and/or a status indicator 136 for providing a visual and/or audio indication of a status or condition associated with the load 106 and/or delivery device 102.

In some embodiments, the delivery device 102 may comprise the receptacle 104. The receptacle 104 may comprise one or more sidewalls 138 coupled to a bottom surface 140 to form an interior space. The receptacle 104 may include a top surface 142 (e.g., a lid, a cover, a top portion, etc.) that may be moveable between an open position and a closed position. For instance, the receptacle 104 may include a hinge or other movable mechanism for moving the top surface 142 relative to the one or more sidewalls 138. In some examples, the receptacle 104 may include one or more inner compartment dividers which may, in some instances, be configured for holding particular types of loads. For instance, a lower compartment may be insulated and/or configured to hold meat or other frozen items and an upper portion may be uninsulated or configured to hold room temperature items (e.g., dry goods, produce, etc.). In some examples, the receptacle 104 may comprise flexible material, such as a nylon or polyester canvas, a rigid material (e.g., plastic, wood, and/or metal), or combinations thereof.

In some examples, the delivery device 102 may comprise the coupler 108 for closing the access opening 110 into the receptacle 104. The coupler 108 may comprise a zipper, a latch, a snap-button, a hook-and-loop, a lid, a lock, a lockable hinge, a lockable pneumatic piston, or combinations thereof. The coupler 108 may comprise one or more sensing elements for detecting actuation events at the coupler 108. The one or more sensing elements of the coupler 108 may form a part of, an entirety of, or may otherwise communicate with the access sensor 112. The one or more sensing elements may, in some instances, generate a voltage signal upon actuation of the one or more sensing elements, for instance, by completing a circuit, breaking a circuit, or causing magnetic induction in a wire. For instance, the one or more sensing elements may comprise one or more conductive metal tabs, magnets, light sensors, tension wires, motion sensors, gyroscopes, combinations thereof positioned to move into contact, out of contact, towards, or away from each other upon actuation of the one or more sensing elements.

The delivery device 102 may include one or more pneumatic pistons for changing the delivery device 102 between the open position and the closed position. The coupler 108 may comprise a locking mechanism on the one or more pneumatic pistons for, upon actuation, preventing the one or more pneumatic pistons from moving. In some instances, the access sensor 112 may communicatively couple to the one or more pneumatic pistons for detecting a motion of the one or more pneumatic pistons. The delivery device 102 may include one or more hinges for moving the delivery device 102 between the open position and the closed position. The one or more hinges may comprise a lockable hinge, such that the one or more hinges themselves may comprise the coupler 108.

The delivery device 102 may include a lock, which may form a part of the coupler 108 or may be separate from the coupler 108. For instance, the lock may comprise a removable lock with a bar that passes through a first zipper tab opening and a second zipper tab opening to secure the zipper in a closed position. In some instances, the lock may include the access sensor 112, such that opening or closing the lock causes the access sensor 112 to detect the occurrence of the access event. For instance, the lock may comprise a digital lock with computing and/or transmitting components for storing and/or sending an indication of the access event detected at the lock to the delivery device 102, the delivery personnel device 202, the recipient device 206, the delivery vehicle 208, the remote server 214, or combinations thereof.

The one or more sensing elements may comprise a first sensing element 144 disposed on the one or more sidewalls 138 (e.g., at a top edge) and a second sensing element 146 may be disposed on a top surface 142 (e.g., on a side edge or an underside). The first sensing element 144 may be positioned at a zipper origin, and/or the second sensing element 146 a predetermined distance from the zipper origin along the zipper. In some instances, the one or more sensing elements may comprise multiple sensing elements distributed substantially evenly along the coupler 108 (e.g., a zipper) that may detect a magnitude of the coupler actuation.

In some embodiments, the delivery device 102 may comprise the access sensor 112 for detecting indications of the access event 114. The access sensor 112 may comprise the one or more sensing elements of the coupler 108 discussed above. Additionally or alternatively, the access sensor 112 may comprise one or more sensor(s) disposed away from the coupler 108, such as in or on the one or more sidewalls 138 and/or the bottom surface 140, for instance, in the interior space for detecting a condition change of the receptacle 104 indicative of the delivery device 102 being changed from an open position to a closed position and/or from a closed position to an open position. For instance, the access sensor 112 may comprises a light sensor that detects an increase or decrease of light in the interior space (e.g., near the access opening), a camera that receives on image of the coupler 108 or the access opening 110, a motion sensor (e.g., gyroscope) for detecting a motion of the receptacle 104, a microphone for detecting a sound of the coupler actuation, or combinations thereof. In some instances, the access sensor 112 may be directed to the access opening 110 and/or the coupler 108 to detect a change to the access opening 110 and/or the couple 108 that may indicate the occurrence of the access event 114.

In some examples, the delivery device 102 may comprise the content sensor 116 for detecting one or more characteristics of the load 106. In some examples, the content sensor 116 may comprise one or more of a weight detector or scale disposed at the bottom surface 140, a light sensor for detecting a presence and/or an absence of the load 106, a camera for receiving an image of the load 106, a motion sensor for detecting an impact or force on the load 106 or a motion of the load 106 along one or more axes, a microphone for detecting a sounds emitted from the load 106, a thermometer or thermocouple for detecting a temperature of the load 106 (e.g., via contact with the load) and/or the interior space, or combinations thereof. In some instances, the content sensor may be disposed in the interior space and/or be directed to a location within the interior space.

In some embodiments, the delivery device 102 may comprise the environment sensor 118 for detecting environmental conditions 120 of the delivery device 102. The environment sensor 118 may be disposed on an outer surface of the receptacle 104 to detect conditions exterior to or otherwise separated from the interior space for holding the load 106 (e.g., conditions inside a delivery vehicle, a room, an outdoor area, etc.). For instance, the environment sensor 118 may comprise one or more of a light sensor for detecting an amount of light (e.g., sunlight) hitting the delivery device 102, a gyroscope for detecting an acceleration of the environment, a camera for receiving an image of an environment around the delivery device 102, a microphone for detecting sounds emitted from the environment, a thermometer or thermocouple for detecting a temperature of the environment, a global positioning system (GPS) sensor for detecting a location of the delivery device, a contact sensor for detecting an impact to the one or more sidewalls, or combinations thereof.

The delivery device 102 may comprise any combination of the access sensor 112, the content sensor 116, and/or the environment sensor 118 and/or pluralities of the access sensor 112, the content sensor 116, and/or the environment sensor 118. In some instances, the access sensor 112, the content sensor 116, and the environment sensor 118 may comprise different or separate sensors. In some instances, one or more of the access sensor 112, the content sensor 116, and the environment sensor 118 may comprise a same or single sensor, for instance, performing multiple functions.

In some examples, the delivery device 102 may comprise the processor 122 for executing instructions stored on the computer-readable storage media 124. The processor 122 may include one or more of a microprocessor, a microcomputer, a microcontroller, a digital signal processor, a central processing unit (CPU), a graphics processing unit (GPU), a quantum processor, combinations thereof, etc. Among other capabilities, the processor(s) 122 may operate to fetch and execute computer-readable instructions stored in the computer-readable media 124, for instance, to perform the operations disclosed herein.

In some examples, the delivery device 102 may comprise the computer-readable media 124, such as a memory device including, but not limited to, phase change memory (PCM), static random-access memory (SRAM), dynamic random-access memory (DRAM), other types of random access memory (RAM), read only memory (ROM), electrically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, a quantum-state storage device, genetic encoding storage device, combinations thereof, or any other medium that can be used to store information for access by an electronic computing device. Databases discussed herein, for instance stored at computer-readable storage media 202, may include one or more of, an SQL data structure, a GraphQL data structure, a NoSQL data structure, a hash-based data structure, an object-based data structure, or any other data type, data structure, a comma delimited list, a spreadsheet, an array, and/or data system for storing retrievable data.

Figure 2:
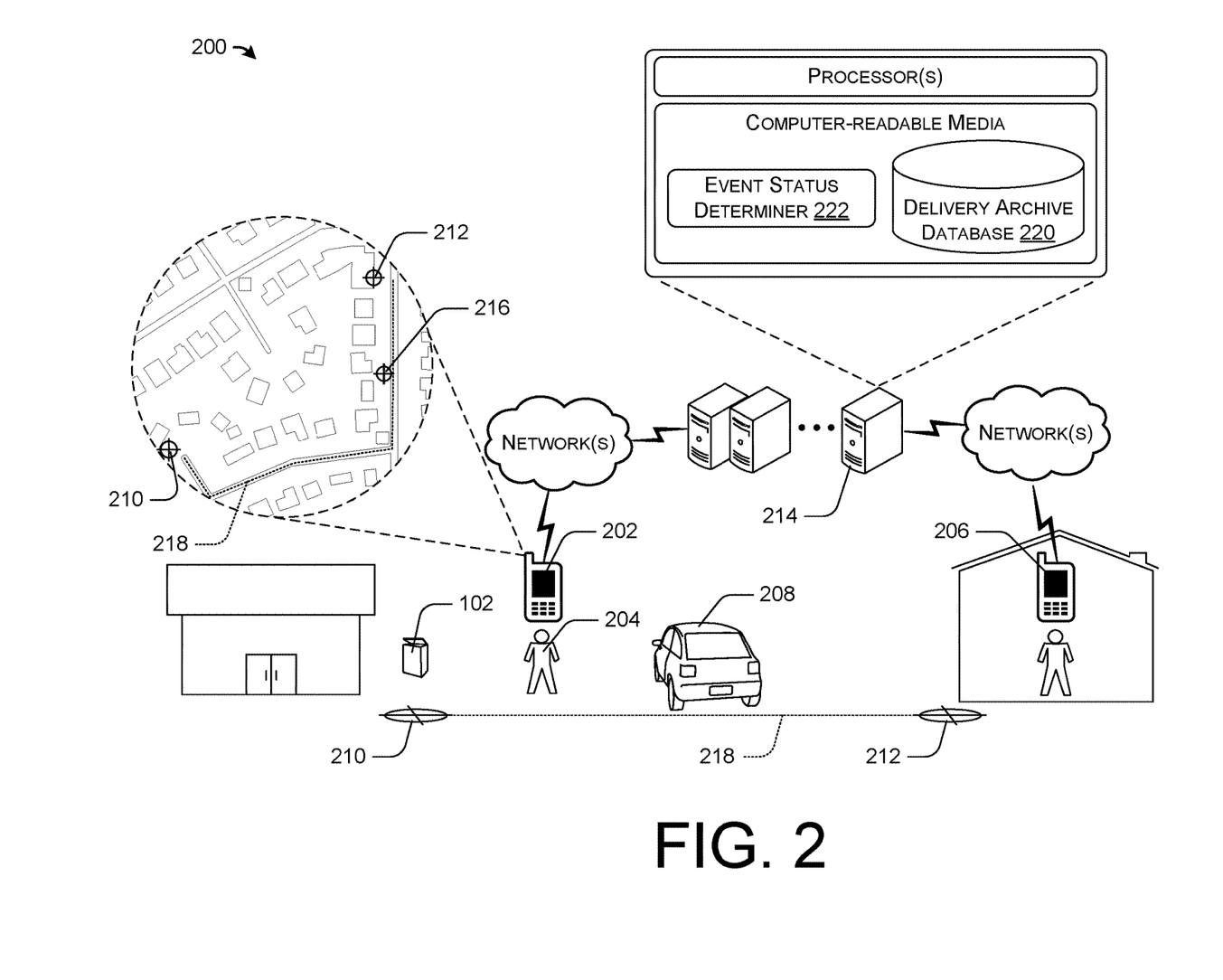
FIG. 2 depicts a schematic diagram of an example system that may include at least the delivery device of FIG. 1, a delivery personnel device, a delivery vehicle, a remote server, and a recipient device.

In some examples, the delivery device 102 may comprise the wireless communicator 126 for communicating with another device (e.g., remote server 214 of FIG. 2). The wireless communicator 126 may comprise one or more hardware and/or software components to connect the delivery device 102 to a wireless network, for instance, via a short range wireless transmission protocol (Wi-Fi, Wi-Fi LP, Bluetooth, Bluetooth LE, Zigbee, Z-Wave, EnOcean) which, in turn, connects to the Internet via an Internet Service Provider (ISP) providing a TCP/IP pathway and/or a Radio Access Network (RAN) such as a 3G network, a 4G network, a 4G Long Term Evolution (LTE) network, a LTE Advanced network, and/or a 5G network. Additionally or alternatively, the wireless communicator 126 may include an embedded transceiver chip for sending an access request to a RAN Base Station which, in turn, connects the delivery device 102 to one or more network(s). In some examples, the wireless communicator 126 may connect to a corresponding communicator disposed in a delivery vehicle (e.g., delivery vehicle 208 of FIG. 2).

In some examples, the delivery device 102 may comprise the device identifier 128 which may be unique to a particular delivery device 102. The device identifier 128 may comprise a visual indicator that may be disposed on an exterior of the delivery device 102. For instance, the device identifier 128 may comprise one or more of an alphanumeric symbol (e.g., "delivery bag #1" or "090788"), a logo, a shape, or other type of visually identifiable symbol. The device identifier 128 may comprise a QR code, bar code, and/or other scannable symbols that may represent an association of the particular delivery device 102 to other stored data (e.g., at the remote server 214 of FIG. 2.), such that, upon scanning of the device identifier 128, another device is directed to the stored data associated with the particular delivery device 102. In some examples, the device identifier may be represented by an RFID tag, and/or other active or passive transmitter sending a signal indicating the device identifier 128.

In some examples, the delivery device 102 may comprise the security apparatus 130 for communicating with a corresponding apparatus at the drop-off location 212, for instance, to disable a security system, for instance, at a residential or commercial delivery location associated with the delivery request. The security apparatus 130 may comprise a wireless transmitter (e.g., similar or identical to the wireless communicator 126 and/or the device identifier 128) that, upon communicating with the corresponding apparatus, sends an encrypted key or token, or other identification credentials indicating that the delivery device 102 corresponds to a delivery request associated with the drop-off location, and therefore the delivery is an authorized delivery. Accordingly, the security system may deactivate a lock at least partly in response to the security apparatus 130 communicating with the corresponding apparatus. In some examples, the security apparatus 130 may comprise the device identifier 128, such as a scannable symbol that, upon being scanned by a scanning device, causes the scanning device to send a signal to the security system instructing the security system to deactivate the lock. In some examples, the security apparatus 130 may comprise an interface for receiving security credentials via a user input provided by the delivery personnel. The security apparatus 130 may comprise a location tracking device (e.g., GPS sensor) that instructs the security system to de-active the lock in response to determining that a previously-authorized delivery device 102 (e.g., via one or more techniques discussed above) is within a predetermined distance of the drop-off location.

In some examples, the delivery device 102 may comprise the delivery assistance system 132 for providing communications to delivery personnel during the delivery process. For instance, the delivery process may include activating the delivery assistance system 132 by providing power (e.g., from a battery source) to one or more components of the delivery assistance system 132, such as an outward facing camera directed to the environment of the delivery device 102, based at least in part on: determining that the delivery device 102 is within a predetermined distance of the drop-off location, a signal sent from the security apparatus 130, a predetermined amount of time elapsing, a user input, and/or combinations thereof. The delivery assistance system 132 may include the outward facing camera that may comprise an omnidirectional camera and/or may take a photo of the environment or the delivery personnel, for instance, in response to a closing the access opening 110 and/or the coupler, based on a location of the delivery device 102, or based on a predetermined amount of time elapsing. The outward facing camera may provide photos and/or a video stream to another device (e.g., remote server 214 and/or recipient device 206 from FIG. 2) during at least a portion of the delivery process. For instance, the delivery assistance system 132 may activate the outward facing camera to provide a live video stream in response to determining that the delivery device 102 is in a residential building associated with the delivery request.

One or more components of the delivery assistance system 132 may include a screen, projector, or other visual display device for providing visual information to the delivery personnel. For instance, the screen may provide a video conference between the delivery personnel and the recipient device, and/or an instruction for delivering the load 106 (e.g., indications of particular refrigerator locations for particular portions of the load 106). The screen may comprise a flexible screen that may be sewn or otherwise embedded into the one or more sidewalls 138 or other portions of the delivery device 102. The delivery assistance system 132 may comprise an audio speaker for providing delivery instructions to the delivery personnel (e.g., previously-stored delivery instructions and/or instructions provided via a communication channel with the recipient device). In some instances, the screen and/or the audio speaker may provide an alert based on an amount of time elapsing that is greater than a predetermined threshold amount (e.g., the alert may say or display "10 minutes left!" or "Late"). The audio speaker may, in some circumstances output an audio signal representing one or more items of the load 106 and/or items to be added to the load 106 (e.g., a grocery list). The delivery assistance system 132 may include a microphone, for instance, to receive audio input from the delivery personnel that may be transmitted to the recipient device. The microphone may, in some instances, activate based on a determination that the delivery device 102 is within a predetermined distance of the recipient device, and/or the microphone (and/or the camera) may record an interaction between the delivery personnel and a person at the drop-off location, such as a recipient associated with the delivery request. The delivery assistance system 132 may comprise an outward facing light for illuminating an area around the delivery device 102 in order to facilitate the delivery.

In some examples, the delivery device 102 may comprise the status indicator 136 for providing a visual and/or audio indication of a status or condition associated with the load 106 and/or delivery device 102. For instance, the status indicator 136 may comprise one or more light-emitting diodes (LED)s disposed at least partly on an exterior of the delivery device 102. The status indicator 136 may include a screen, such as a flexible screen as discussed above. The status indicator 136 may provide an indication based at least in part on the delivery device 102 (e.g., via the processor 122 and/or the access sensor 112) determining the occurrence of the tamper event, detecting a temperature (e.g., determined via the access sensor 112, the content sensor 116, and/or the environment sensor 118) that is greater than or less than a predetermined temperature value, determining that a predetermined amount of time has elapsed, and/or based on determining that the delivery device 102 has experienced an impact or force greater than a predetermined threshold value. The status indicator 136 may include a wireless transmitter (similar or identical to those discussed above) for sending the indication to the recipient device, for instance, as an alert at the recipient device.

FIG. 2. depicts a system 200 that may include the delivery device 102 and one or more other components that communicate or interact with the delivery device 102 or otherwise form a portion of a delivery process involving the delivery device 102. For instance, the system 200 may include a delivery personnel device 202 associated with a delivery personnel 204, a recipient device 206 associated with the delivery request, the delivery device 102 for carrying the load 106, a delivery vehicle 208 for carrying the delivery device 102 and/or the delivery personnel 204, a pick-up location 210 representing a physical place where the load 106 is located for pick-up by the delivery personnel 204 and/or the delivery vehicle 208 (e.g., to initiate the delivery process), a drop-off location 212 representing a physical place to where delivery of the load 106 is intended by the delivery request, a remote server 214 for at least communicating with other devices (e.g., the delivery device 102, the delivery personnel device 202, the recipient device 206, and/or the delivery vehicle 208) and analyzing data related to the delivery, one or more intermediary stop locations 216 that may be positioned on a route 218 between the pick-up location 210 and the drop-off location 212.

In some examples, the system 200 may include the delivery personnel device 202 associated with the delivery personnel 204. The delivery personnel device 202 may comprise one or more processor(s) and/or computer-readable media (which may be similar or identical to the one or more processor(s) 122 and the computer-readable media 124 discussed above with respect to FIG. 1). For instance, the delivery personnel device 202 may comprise a mobile device of the delivery personnel 204, such as a smart phone, a tablet device, a laptop device, a specialized mobile delivery device, a wearable device, combinations thereof, or any other device used by the delivery personnel for the delivery and/or for multiple deliveries. The delivery personnel device 202 may include any of the components discussed above regarding the delivery device 102, such as a camera, a wireless transmitter, etc. The delivery personnel device 202 may store one or more applications, for instance, to provide a communication channel between the delivery personnel device 202 and another device, such as the recipient device 206, the remote server 214, the vehicle 208, or combinations thereof. The one or more applications may present a graphical user interface on a display of the delivery personnel device 202, for instance, to present information to the delivery personnel 204 and/or to receive an input from the delivery personnel 204. In some instances, the system 200 may determine a distance between the delivery personnel device 202 and the delivery device 102 (e.g., via one or more GPS sensors and/or a wireless transmission between the delivery personnel device 202 and the delivery device 102). The system 200 may determine whether the distance between the delivery personnel device 202 and the delivery device 102 is greater than a predetermined distance threshold and, if so, trigger an alarm. For instance, the system 200 may send an alert to the recipient device 206 indicating that the delivery personnel device 202 is outside the predetermined distance threshold from the delivery device 102. In this way, the system 200 may provide a virtual "tether" between the delivery personnel device 202 and the delivery device 102.

In some embodiments, the system 200 may include the recipient device 206 associated with the delivery request. The recipient device 206 may comprise one or more processor(s) and computer-readable media (which may be similar or identical to the one or more processor(s) 122 and the computer-readable media 124 discussed above with respect to FIG. 1). For instance, the recipient device 206 may comprise a same type of device as and/or share any attributes with any of the devices discussed above (e.g., the delivery personnel device 202. The recipient device 206 may, via a graphical user interface presented on a display of the recipient device 206, receive one or more inputs (e.g., from a recipient of the deliver) associated with the delivery request, as discussed below in greater detail regarding FIG. 3. In some instances, the recipient device 206 may comprise multiple recipient devices 206, for instance, that may be associated with a user account stored at the remote server 214. A first recipient device of the multiple recipient devices 206 may send the delivery request, and a second recipient device (which may be different than the first recipient device) may receive a delivery completion passcode to provide (e.g., via a user input at the second recipient device) in order to indicate a completion of the delivery, as discussed in greater detail below.

In some examples, the system 200 may include the delivery device 102 for carrying the load 106. The delivery device 102 may include the access sensor 112, the content sensor 116, the environment sensor 118, and/or one or more other components, as discussed in greater detail above regarding FIG. 1.

In some embodiments, the system 200 may include the delivery vehicle 208 for carrying the delivery device 102 and/or the delivery personnel 204. The delivery vehicle 208 may comprise a motor vehicle (e.g., a car, a truck, a motorcycle, a scooter, skateboard, aircraft, hoverboard, etc.) or a non-motorized vehicle (e.g., a bicycle, a tricycle, a scooter, a skateboard, etc.) navigated by the delivery personnel 204 and/or navigated autonomously. In some examples, the delivery vehicle 208 may include one or more processors, computer-readable media (which may be similar or identical to the one or more processor(s) 122 and the computer-readable media 124 discussed above with respect to FIG. 1), and/or any other components of the other devices discussed herein (e.g., the delivery device 102, the delivery personnel device 202, the recipient device 206, the remote server 214, etc.). In some examples, the delivery vehicle 208 may include a GPS sensor and/or other mapping or navigation components for collecting location information and/or providing navigation instructions. The delivery vehicle 208 may communicate with the other devices discussed herein (e.g., to send location information collected by the delivery vehicle 208 to the delivery device 102, the delivery personnel device 202, the recipient device 206 and/or the remote server 214.).

In some examples, the system 200 may include the pick-up location 210 representing the physical place where the load 106 is located for pick-up by the delivery personnel 204 and/or the delivery vehicle 208 (e.g., to initiate the delivery process). The pick-up location 210 may comprise coordinates (e.g., GPS coordinates, longitudinal and latitudinal coordinates, map coordinates, etc.), a building, a street address, or any other physical location. The pick-up location 210 may be determined based on information included in the delivery request. For instance, an indication of the pick-up location 210 may be provided via a user input at the recipient device 206.

In some embodiments, the system 200 may include the drop-off location 212 representing a physical place to where delivery of the load 106 is intended by the delivery request. Similar to the pick-up 13location, the drop-off location 212 may comprise coordinates (e.g., GPS coordinates, longitudinal and latitudinal coordinates, map coordinates, etc.), a building, a street address, or any other physical location. The drop-off location 212 may be determined based on information included in the delivery request. For instance, an indication of the drop-off location 212 may be provided via a user input at the recipient device 206. The indication of the drop-off location 212 may be stored, in some examples, at the remote server 214 as a preference associated with a user profile that corresponds to the recipient device 206.

In some examples, the system 200 may include the remote server 214 for at least communicating with the other devices (e.g., the delivery device 102, the delivery personnel device 202, the recipient device 206, and/or the delivery vehicle 208) and analyzing data related to the delivery. The remote server 214 may comprise one or more processor(s) and a computer-readable media (which may be similar or identical to the one or more processor(s) 122 and the computer-readable media 124 discussed above with respect to FIG. 1), and/or any other components of the other devices discussed herein (e.g., the delivery device 102, the delivery personnel device 202, the recipient device 206, the delivery vehicle 208, etc.). The remote server 214 may comprise a single remote server 214 or multiple remote servers 214, for instance, located at different locations.

In some examples, the remote server 214 may store one or more applications or other algorithm modules for providing communication channels with the other devices discussed herein (e.g., the delivery device 102, the recipient device 206, and/or the delivery vehicle 208), for receiving and storing information from the other devices, for performing analysis on data received from the other devices, and/or for sending information to the other devices. The remote server 214 may include one or more databases, such as a delivery personnel device registration database 216 for storing information associated with the delivery personnel device 202 that may include a first unique identifier, an identity of the delivery personnel 204, a delivery vehicle identifier associated with the delivery vehicle 208, an archive of previous delivery information, and/or location information. The one or more databases may include a recipient device registration database 218 for storing information associated with the recipient device 206 that may include a second unique identifier, an identity of the recipient, location information associated with one or more drop-off locations 212 and/or one or more pick-up locations 210 (e.g., restaurants), identifiers of other recipient devices 206 that are also authorized to send delivery requests and/or receive deliveries, and other information that may be provided via a user input from the recipient. The one or more databases may include a delivery archive database 218 for storing information related to one or more deliveries, such as previous deliveries that may include information generated from one or more delivery device(s) 102, one or more delivery personnel device(s) 202, one or more recipient device(s) 206, one or more delivery vehicle(s) 208, and/or one or more remote server(s) 214 during a previous delivery (e.g., while the delivery vehicle 208 was traveling between a previous pick-up location and a previous drop-off location that may be different than the pick-up location 210 and the drop-off location 212). The delivery archive database 218 may store request information associated with delivery requests received at the remote server 213, and the delivery archive database may store a rating value associated with the delivery personnel 204 (e.g., via an association with a delivery personnel device identifier stored at the delivery personnel device registration database 216.) The rating may be based at least in part on a number of tamper events associated with delivery personnel 204, e.g., via one or more associations with the delivery device(s) 102 that experienced the tamper events. In some instances, information from the delivery archive database 220, such as the rating, may be accessed by a third-party (e.g., a restaurant, the recipient, etc.) to request a particular delivery personnel 204 for the delivery in the delivery request.

In some embodiments, the remote server 214 may include an event status determiner 222. The event status determiner 222 may comprise software algorithms (e.g., an application) for receiving information associated with one or more event(s) (e.g., access event(s) 114) occurring at the delivery device 102 and determining whether the event(s) comprise an authorized event or a tamper event. For instance, the event status determiner 222 may receive information representing data generated from the access sensor 112 (e.g., discussed in greater detail above regarding FIG. 1) in response to the occurrence of the access event 114. The event status determiner 222 may receive information representing data generated from other sensors in addition to the access sensor 112, such as the content sensor 116 (e.g., indicating a weight value associated with the load 106 during the access event 114), the environment sensor, or any other data discussed herein. For instance, the event status determiner may receive location data from the delivery vehicle 208, data from other devices discussed herein. The event status determiner 222 may correlate timestamps and/or location data associated with the access event 114 to determine what data may be relevant to determining whether the access event 114 comprises an authorized event or a tamper event. For instance, the event status determiner 222 may store one or more predetermined threshold values or event conditions that are associated with an authorized event. For instance, the predetermined threshold values or event conditions may comprise: being within a distance threshold from the drop-off location 212, being within a timing threshold (e.g., that begins running upon arriving at the drop-off location 214, leaving the pick-up location, closing the access opening, or combinations thereof), receiving a confirmation input or permission grant from the recipient device 206, receiving a permission request from the delivery personnel device 202, a location of the delivery device being within a predetermined distance of a location specified in the delivery request, and/or combinations thereof.

Upon receiving data from the delivery device 102, the event status determiner 222 may compare the received data to the predetermined threshold values or event conditions stored at the remote server 214 and determine that the access event 114 comprises an authorization event based on the received information satisfying one or more of the predetermined threshold values or event conditions discussed above to within a predetermined confidence interval (e.g., 90%, 95%, 99%, 99.9%, etc.). The event status determiner 222 may determine that received information indicates that one or more of the predetermined threshold values or event conditions are not satisfied (e.g., the delivery device 102 is outside a distance threshold, the access event 114 occurs outside a timing threshold, an absence of a confirmation from the recipient device 206, etc.) and, accordingly, determine that the access event 114 comprises a tamper event.

In some embodiments, the system 200 may include one or more intermediary stop location(s) 216 positioned on a route 218 between the pick-up location 210 and the drop-off location 212. For instance, the load 106 may be divisible into multiple sub-loads, one or more of the sub-loads corresponding to a delivery at the one or more intermediary stop location(s) 216. Accordingly, the delivery may include multiple access events 114 that may be determined to correspond to the intermediary stop location(s) 216 (e.g., by the event status determiner 222) and, therefore, may be determined to comprise authorized events. In some instances, the system 200 may receive weight values associated with the load 106 from the delivery device 102 at the one or more intermediary stop location(s) 216. The event status determiner 222 may determine a weight difference value upon a delivery of the sub-load at the intermediary stop location 216, the weight difference value corresponding to a weight of the sub-load. The event status determiner 222 may compare the weight difference value and to a stored threshold sub-load weight value to determine whether the delivery of the sub-load at the intermediary stop location 216 comprises a correct sub-load delivery or an incorrect sub-load delivery.

In some examples, the operations performed at the remote server 214 as discussed herein may additionally or alternatively be performed, in part or entirely, by one or more of the other devices discussed herein (e.g., the delivery device 102, the delivery personnel device 202, the recipient device 206, and/or the delivery vehicle 208). For instance, the event status determiner 222 may be stored and/or executed at the delivery device 102. For instance, the delivery device 102 may determine that the access event comprises the tamper event and send an indication of the determination to the remote server 214. One or more of the databases discussed herein with respect to the remote server 214 may be stored at one or more of the other devices.

Figure 3:
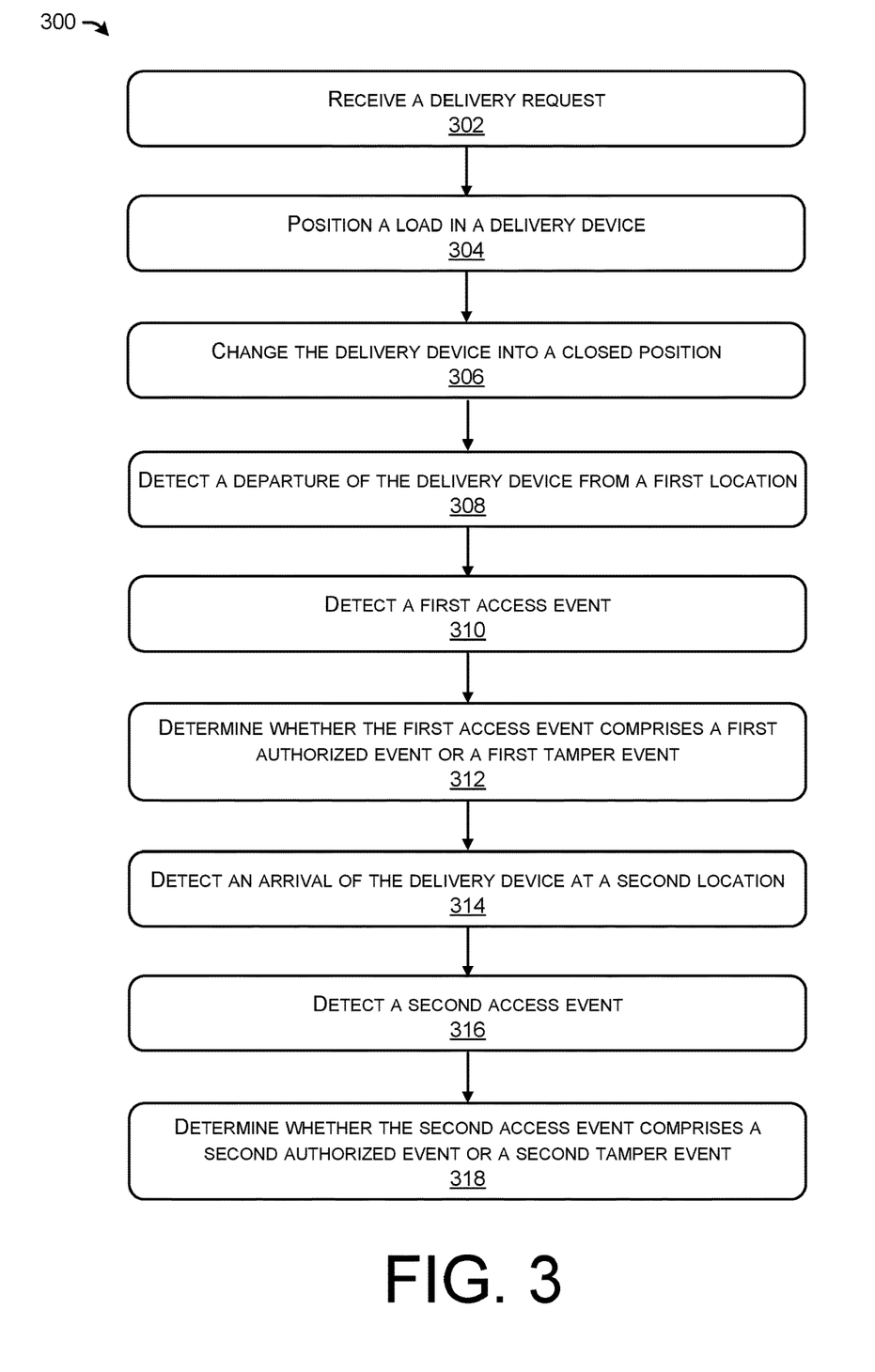
FIG. 3 depicts a method including steps that may be performed by one or more of the example system(s) and device(s) depicted in FIG. 1 and FIG. 2.

FIG. 3 depicts an example method 300 that may be performed by any of the systems or devices discussed herein. The method 300 may include one or more steps for receiving a delivery request and, based at least in part on the delivery request, delivering the load 106 from the pick-up location 210 to the drop-off location 212 via the delivery device 102. Although some of the steps depicted in FIG. 3 may be described as performed by the system 200, system 100 may perform any of the steps depicted in FIG. 3 as well.

For instance, at step 302, the system 200 may receive the delivery request. For instance, the remote server 214 may receive the delivery request from the recipient device 206. The delivery request may indicate the pick-up location 210, the drop-off location 212, a requested delivery personnel 204, a delivery time threshold (e.g., within 30 minutes, within one hour, etc.), a delivery time (e.g., about 11:00 am, about 12:00 pm, etc.), an identifier associated with the recipient and/or the recipient device 206, or combinations thereof. In some instances, the delivery request may indicate a restaurant as the pick-up location. In response to receiving the delivery request, the remote server 214 may send a message to the delivery personnel device 202 instructing the delivery personnel 204 to pick up the load at the pick-up location 210 and deliver the load (e.g., via the delivery vehicle 208) to the drop-off location 212.

At step 304, the load 106 may be positioned into the delivery device 102. For instance, the delivery personnel 204 (e.g., upon arriving at the pick-up location 210 and receiving the load 106 from a third-party, such as a restaurant) may position the load 106 in the receptacle 104. The delivery personnel 204 may disengage the coupler 108, open the access opening 110, and place the load 106 into the interior space of the receptacle 104. Sensors disposed on the delivery device 102 (e.g., the access sensor 112, the content sensor 116, the environment sensor 119, combinations thereof) may detect step 304 and generate data, for instance, to send to the computer-readable media 124 and/or the remote server 214 that may be timestamped or otherwise associated with positioning the load 106 in the receptacle 104. For instance, the remote server 214 may store an association of the delivery device 102 with the delivery request. In some examples, the delivery personnel device 202 may capture an image of the load 106 positioned in the receptacle 104 (e.g., via a camera) to generate a confirmation that the load 106 is positioned in the receptacle 104. In some instances, the system 200 may receive an input at a third-party device of the third-party associated with the pick-up location (e.g., a restaurant device). For instance, the system 200 may determine that the delivery is initiated based at least in part on receiving the input at the third-party device. The input at the third-party device may include an indication of the delivery device 102 (e.g., the delivery device identifier) and/or the delivery personnel 204 or the delivery personnel device 202, such that the system 200 may store an association between the delivery personnel device 202 and the delivery device 102 based at least in part on the input received at the third-party device.

At step 306, the delivery device 102 may be changed into the closed position. For instance, the access opening 110 may be closed (e.g., by the delivery personnel 204) by moving the top surface 142 from the open position and to the closed position. The coupler 108 may be actuated to hold the delivery device in the closed position. As discussed in greater detail above regarding FIG. 1, the access sensor may detect and/or generate data based on the delivery device being changed into the closed position. Other sensors disposed on the delivery device 102 (e.g., the content sensor 116, the environment sensor 119, combinations thereof) may detect step 306 and generate data. For instance, in response to detecting that the delivery device has changed into the closed position, the content sensor 116 may detect a weight value associated with the load (e.g., by entering a "weighing mode" for a predetermined duration, such as 5 seconds, 10 seconds, 20 seconds, etc.) and send the weight value to the computer-readable media 124 and/or the remote server 214. The weight value may be timestamped or otherwise associated with closing the access opening 110 and/or actuating the coupler 108. The weight value detected in response to closing the delivery device 102 may comprise a first weight value. In some examples, the delivery personnel device 202 may scan the device identifier 128 to generate a confirmation that the delivery device 102 has been changed to the closed position.

At step 308, the system 200 may detect a departure of the delivery device 102 from a first location. For instance, the delivery device 102 carrying the load 106 may be placed in the delivery vehicle 208, and the delivery vehicle 208 may navigate away from the pick-up location 210. In some examples, the content sensor 116 and/or the environment sensor 118 may activate, generate data, and send data (e.g., such as weight data, temperature data, image data, etc. as discussed in greater detail above regarding FIG. 1) at least partly in response to determining that the delivery device 102, the delivery personnel device 202, and/or the delivery vehicle 208 have traveled a predetermined distance value from the pick-up location 210.

At step 310, the system 200 may detect a first access event occurring at the delivery device 102. For instance, the access sensor 112 may detect that the delivery device 102 has been changed from the closed position to the opened position (e.g., via the techniques discussed above regarding FIG. 1). In response to detecting the occurrence of the first access event, the system 200 may determine a second weight associated with the load 106 (e.g., via the content sensor 116) and associated with the first access event. The system 200 determine location information associated with first access event in response to detecting the occurrence of the first access event.

As step 312, the system 200 may determine whether the first access event comprises a first authorized event or a first tamper event. For instance, the delivery device 102, the delivery personnel device 202, the recipient device 106, and/or the remote server 214 may execute the event status determiner 222, as discussed in greater detail above regarding FIG. 2, to determine whether data received at step 310 matches an authorized event profile or a tamper event profile. For instance, the system 200 may calculate whether a match is within a predetermined authorized event confidence threshold, outside the predetermined authorized event confidence threshold, within a predetermined tamper event confidence threshold, or outside the predetermined tamper event confidence threshold. In some examples, the system 200 may determine whether the first access event comprises an authorized event or a tamper event based at least partly on determining whether the access event corresponds to the intermediary stop location 216 (e.g., is within a predetermined distance of the intermediary stop location 216). In some examples, the system 200 may send an indication of an event status (e.g., whether the access event comprises the authorized event or the tamper event), for instance, to the recipient device 206, for instance, to be displayed via a graphical user interface at the recipient device 206. In some instances, the delivery device 102 may determine the event status and send an indication of the event status to the remote server 214. The indication may include the timestamp associated with the tamper event, an identifier of the delivery personnel 204, and/or location information associated with the tamper event. The indication may, in some instances, be sent to the third-party device (e.g., a restaurant device) associated with the pick-up location. Additionally or alternatively, the status indicator 136 may indicate the event status (e.g., via one or more color-coded LEDs) at an exterior of the delivery device 102. In some instances, the system 200 may determine that the first access event corresponds to the intermediary stop location 216 at which an additional load is to be added to the load 106. The delivery device 102 may, in response, activate the audio speaker to recite aloud an instruction or description of the additional load (e.g., a grocery list) that may be associated with picking up the additional load at the intermediary stop location 216. In some instances, the system 200 may provide a cancellation option to the recipient device 206 at least partly in response to determining that the first access event comprises the first tamper event. The system 200 may provide an estimated time of arrival to the recipient device 206.

At step 314, the system 200 may detect an arrival of the delivery device 102 at a second location. For instance, the second location may comprise the drop-off location 212, and the system 200 (e.g., via a GPS sensor at the delivery vehicle 208 and/or at the delivery device 102) may determine that the delivery device 102 is within a predetermined distance value of the drop-off location 212. In some instances, the system 200 may detect the arrival of the delivery device 102 at the drop-off location based at least in part on a first user input received at the delivery personnel device 202, a second user input received at the recipient device, or combinations thereof.

At step 316, the system 200 may detect a second access event occurring at the delivery device 102. For instance, one or more sensors of the delivery device 102 may detect the second access event via similar or identical techniques discussed above regrading step 310 and FIG. 1.

At step 318, the system 200 may determine whether the second access event comprises a second authorized event or a second tamper event. For instance, the delivery device 102, the delivery personnel device 202, the recipient device 206, the delivery vehicle 208, and/or the remote server 214 may execute the event status determiner 222, as discussed in greater detail above regarding step 312 and FIG. 2, to determine the event status of the second access event (e.g., whether the second access event comprises a second authorized event or a second tamper event). In some instances, the system 200 may determine that the second access event comprises the second authorized event based at least in part on detecting the arrival of the delivery device at the drop-off location 212 (e.g., step 314). In some instances, the system 200 may determine that the second access event comprises the second tamper event based at least in part on an absence of detecting the arrival of the delivery device at the drop-off location 212. In some examples, the system 200 may determine that the delivery associated with the delivery request is complete based at least in part on receiving an input (e.g., a fingerprint, an audio phrase, the delivery completion passcode, etc.) at the delivery device 102, the delivery personnel device 202, and/or the recipient device 206. The input may be compared to a corresponding stored delivery completion indicator to determine if the input indicates a completed delivery.

Although FIG. 3 depicts example steps, the described steps in these figures (and all other methods and operations disclosed herein) may be performed in other orders different than those illustrated in FIG. 3 and multiple steps may be performed simultaneously and/or in parallel. Furthermore, in some embodiments, one or more operations illustrated in FIG. 3 may be omitted, repeated, and/or combined with other operations illustrated in FIG. 3 and/or any other operations and components discussed in this disclosure. In some instances, any of the steps illustrated in FIG. 3 may be performed at least partly in response to any other of the steps illustrated in FIG. 3. In some instances, the operations discussed herein may be performed in multiple iterations for instance, to manage thousands, or even millions of delivery devices, on a global scale.

In some instances, the system 100, delivery device 102, system 200, and/or method 300 may provide other types of deliveries, such as a delivery wherein the load 106 comprises money (which may omit a temperature sensor), a fluid sample for drug testing, a tissue sample, an organ transplant, and/or a skin biopsy. In some instances, the load 106 may comprise one or more beer or samples, and the intermediary stop locations 216 may correspond to one or more potential buyer locations (e.g., bars, restaurants, hotels, etc.) As such, the one or more weight values collected during the delivery may indicate an amount of product consumed at the intermediary stop locations 216.

CONCLUSION

Although this disclosure uses language specific to structural features and/or methodological acts, it is to be understood that the scope of the disclosure is not necessarily limited to the specific features or acts described. Rather, the specific features and acts are disclosed as illustrative forms of implementation.

What is claimed is:

1. A delivery device comprising:
 one or more sidewalls coupled to a bottom surface to form an interior space configured to contain a load:
 an access opening into the interior space;
 a coupler disposed at least partially around the access opening for closing the access opening;
 an access sensor to determine an occurrence of an actuation event at the coupler;
 a delivery assistance system;
 a transmitter;
 one or more processors; and
 one or more computer-readable storage media storing instructions that, when executed by the one or more processors, cause the delivery device to perform steps comprising:
 determine, based at least in part on first access data received from the access sensor, that the coupler has been actuated to close the access opening;
 determine, based at least in part on determining that the coupler has been actuated to close the access opening, that a delivery of the delivery device containing the load is initiated;
 receive second access data from the access sensor indicating that the coupler has been actuated to open the access opening;
 send, via the transmitter, based at least in part on the second access data, and to at least one of a remote server or a recipient device, an indication of an access event associated with the delivery device;
 determine that the delivery device is within a predetermined distance of a drop-off location; and
 provide power, from a battery source of the delivery device, to the delivery assistance system based on determining that the delivery device is within the predetermined distance of the drop-off location.

2. The delivery device of claim 1, wherein determining that the delivery of the delivery device containing the load is initiated is further based at least in part on one or more of:
 receiving a first input from a delivery personnel device;
 receiving a second input from a third-party device associated with a pick-up location; or
 receiving location data indicating that the delivery device containing the load is a distance from the pick-up location that is greater than a distance threshold.

3. The delivery device of claim 2, wherein the first input is based at least in part on the delivery personnel device detecting a device identifier disposed on an exterior of the delivery device.

4. The delivery device of claim 1, wherein the coupler comprises a zipper and the access sensor comprises at least one of a first sensing element disposed at a zipper origin or second sensing element disposed a predetermined distance from the zipper origin.

5. The delivery device of claim 1, further comprising a content sensor, and wherein the steps further comprise:
 determine, based at least in part on content data received from the content sensor indicating a characteristic associated with the load, that the load is contained in the interior space after the coupler has been actuated to close the access opening.

6. The delivery device of claim 5, wherein the content sensor comprises a weight sensor disposed at the bottom surface, and the characteristic comprises a weight value.

7. The delivery device of claim 1, wherein the steps further comprise determine that the access event comprises a tamper event.

8. The delivery device of claim 1, wherein:
 the access sensor comprises:
 one or more sensing elements to determine the occurrence of the actuation event at the coupler; and
 a temperature sensor to detect a change of temperature in the interior space; and
 sending the indication of the access event is further based at least in part on the temperature sensor detecting the change of the temperature in the interior space.

9. A delivery device comprising:
 one or more sidewalls coupled to a bottom surface to form an interior space configured to contain a load:

an access opening into the interior space;
a coupler disposed at least partially around the access opening for closing the access opening;
an access sensor to determine an occurrence of an actuation event at the coupler;
a delivery assistance system comprising:
  a camera disposed on an exterior of the delivery device;
  a microphone disposed at the delivery device;
  a light disposed on the exterior of the delivery device; and
  a speaker disposed at the delivery device;
a transmitter;
one or more processors; and
one or more computer-readable storage media storing instructions that, when executed by the one or more processors, cause the delivery device to perform steps comprising:
determine, based at least in part on first access data received from the access sensor, that the coupler has been actuated to close the access opening;
determine, based at least in part on determining that the coupler has been actuated to close the access opening, that a delivery of the delivery device containing the load is initiated;
receive second access data from the access sensor indicating that the coupler has been actuated to open the access opening;
send, via the transmitter, based at least in part on the second access data, and to at least one of a remote server or a recipient device, an indication of an access event associated with the delivery device;
determine that the delivery device is within a predetermined distance of a drop-off location;
establish a communication channel between the delivery device and the recipient device associated with the delivery; and
provide power, from a battery source of the delivery device, to the delivery assistance system based on determining that the delivery device is within the predetermined distance of the drop-off location.

10. A delivery device comprising:
a receptacle having an interior space configured to contain a load;
a coupler that is actuatable to open and close an access opening into the interior space;
an access sensor to determine an occurrence of an actuation event at the coupler;
a delivery assistance system;
a transmitter;
one or more processors; and
one or more computer-readable storage media storing instructions that, when executed by the one or more processors, cause the delivery device to perform acts comprising:
determine, based at least in part on first access data received from the access sensor, that the coupler has been actuated to close the access opening;
determine, based at least in part on determining that the coupler has been actuated to close the access opening, that a delivery of the delivery device containing the load is initiated: receive second access data from the access sensor indicating that the coupler has been actuated to open the access opening;
send, via the transmitter, based at least in part on the second access data, and to at least one of a remote server or a recipient device, an indication of an access event associated with the delivery device;
determine that the delivery device is within a predetermined distance of a drop-off location; and
provide power, from a battery source of the delivery device, to the delivery assistance system based on determining that the delivery device is within the predetermined distance of the drop-off location.

11. The delivery device of claim 10, wherein determining that the delivery of the delivery device containing the load is initiated is further based at least in part on one or more of:
receiving a first input from a delivery personnel device;
receiving a second input from a third-party device associated with a pick-up location; or
receiving location data indicating that the delivery device containing the load is a distance from the pick-up location that is greater than a distance threshold.

12. The delivery device of claim 10, wherein the coupler comprises a zipper and the access sensor comprises at least one of a first sensing element disposed at a zipper origin or second sensing element disposed a predetermined distance from the zipper origin.

13. The delivery device of claim 10, further comprising a content sensor, and wherein the acts further comprise:
determine, based at least in part on content data received from the content sensor indicating a characteristic associated with the load, that the load is contained in the interior space after the coupler has been actuated to close the access opening.

14. The delivery device of claim 13, wherein the content sensor comprises a weight sensor disposed at a bottom of the receptacle, and the characteristic comprises a weight value.

15. The delivery device of claim 10, wherein:
the access sensor comprises:
  one or more sensing elements to determine the occurrence of the actuation event at the coupler; and
  a light sensor to detect an increase of light in the interior space; and
sending the indication of the access event is further based at least in part on the light sensor detecting the increase of the light in the interior space.

16. The delivery device of claim 10, wherein:
the access sensor comprises:
  one or more sensing elements to determine the occurrence of the actuation event at the coupler; and
  a temperature sensor to detect a change of temperature in the interior space; and
sending the indication of the access event is further based at least in part on the temperature sensor detecting the change of the temperature in the interior space.

17. A delivery device comprising:
a receptacle having an interior space configured to contain a load;
a coupler that is actuatable to open and close an access opening into the interior space;
an access sensor to determine an occurrence of an actuation event at the coupler;
a delivery assistance system comprising:
  a camera disposed on an exterior of the delivery device; and
  a light disposed on the exterior of the delivery device;
a transmitter;
one or more processors; and
one or more computer-readable storage media storing instructions that, when executed by the one or more processors, cause the delivery device to perform acts comprising:

determine, based at least in part on first access data received from the access sensor, that the coupler has been actuated to close the access opening;

determine, based at least in part on determining that the coupler has been actuated to close the access opening, that a delivery of the delivery device containing the load is initiated: receive second access data from the access sensor indicating that the coupler has been actuated to open the access opening;

send, via the transmitter, based at least in part on the second access data, and to at least one of a remote server or a recipient device, an indication of an access event associated with the delivery device;

determine that the delivery device is within a predetermined distance of a drop-off location; and provide power, from a battery source of the delivery device, to the delivery assistance system based on determining that the delivery device is within the predetermined distance of the drop-off location.

* * * * *